(12) United States Patent
Hung

(10) Patent No.: US 9,395,502 B2
(45) Date of Patent: Jul. 19, 2016

(54) APPARATUS AND METHOD FOR COUPLING OPTICAL SIGNALS BETWEEN OPTICAL FIBERS AND PHOTO DEVICES

(75) Inventor: Henry H. Hung, Phoenix, AZ (US)

(73) Assignee: OPTILAB, LLC, Phoenix, AZ (US)

( * ) Notice: Subject to any disclaimer, the term of this patent is extended or adjusted under 35 U.S.C. 154(b) by 174 days.

(21) Appl. No.: 13/599,725

(22) Filed: Aug. 30, 2012

(65) Prior Publication Data

US 2014/0064663 A1    Mar. 6, 2014

Related U.S. Application Data

(60) Provisional application No. 61/694,130, filed on Aug. 28, 2012.

(51) Int. Cl.
*G02B 6/30* (2006.01)
*G02B 6/42* (2006.01)

(52) U.S. Cl.
CPC ............... *G02B 6/42* (2013.01); *G02B 6/4203* (2013.01); *G02B 6/4214* (2013.01); *G02B 6/4295* (2013.01); *G02B 6/4296* (2013.01); *G02B 6/4246* (2013.01)

(58) Field of Classification Search
CPC ........ G02B 6/30; G02B 6/423; G02B 6/3636; G02B 6/3652; G02B 6/4246; G02B 6/42; G02B 6/4203; G02B 6/4214; G02B 6/4295; G02B 6/4296

USPC ........................................................... 385/49
See application file for complete search history.

(56) References Cited

U.S. PATENT DOCUMENTS

| 6,874,950 | B2 * | 4/2005 | Colgan et al. .................. 385/88 |
| 8,064,745 | B2 * | 11/2011 | Fortusini et al. .............. 385/37 |
| 2011/0075132 | A1 * | 3/2011 | Sutherland .................... 356/138 |
| 2011/0091181 | A1 * | 4/2011 | DeMeritt .......... G02B 6/02033 385/140 |

* cited by examiner

*Primary Examiner* — Jerry Blevins
(74) *Attorney, Agent, or Firm* — George L. Fountain; Loza & Loza, LLP

(57) ABSTRACT

Apparatus and method for optically interfacing optical fibers with photo devices. In one implementation, the optical fiber comprises an end surface configured to produce internal reflection of an incident optical signal propagating within the fiber from a distal end, and a photo device configured to receive the reflected optical signal. In another implementation, the optical fiber comprises an end surface configured to produce internal reflection of an incident optical signal generated by a photo device for propagation within the fiber towards a distal end. In another implementation, the optical fiber comprises an end surface configured to refract an incident optical signal propagating within the fiber from a distal end, and a photo device configured to receive the refracted optical signal. In another implementation, the optical fiber comprises an end surface configured to refract an incident optical signal generated by a photo device for propagation within the fiber towards a distal end.

14 Claims, 5 Drawing Sheets

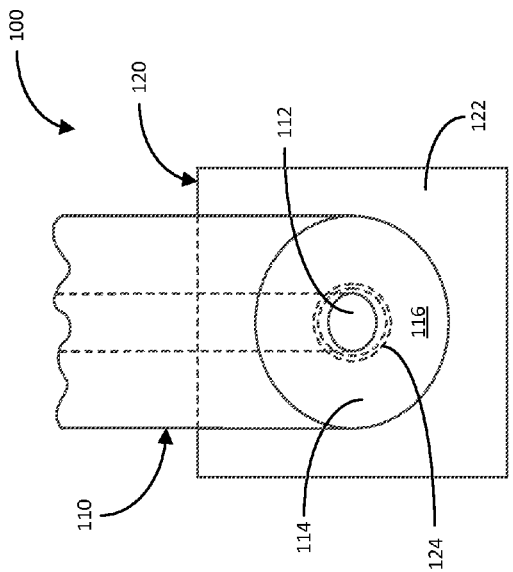
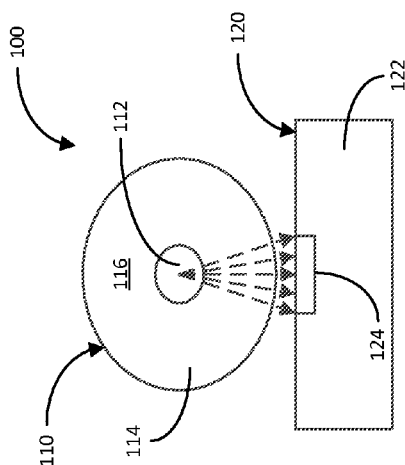
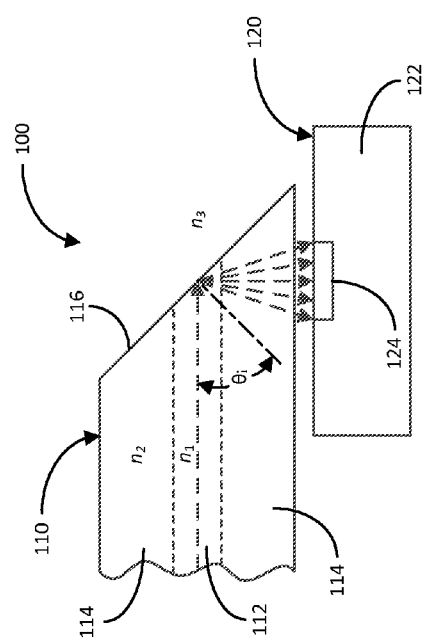
FIG. 1C
FIG. 1B
FIG. 1A

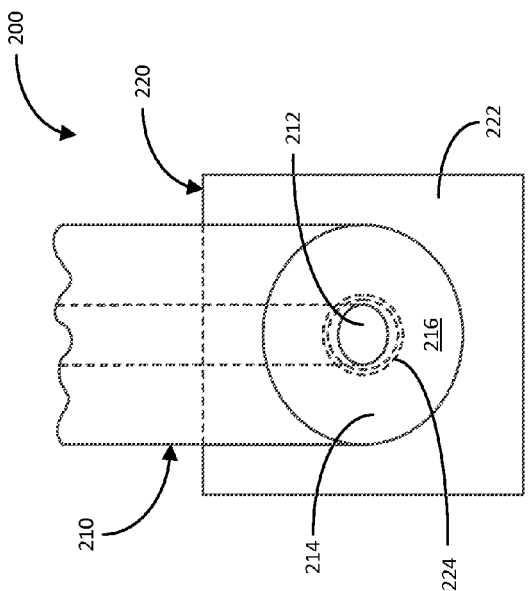
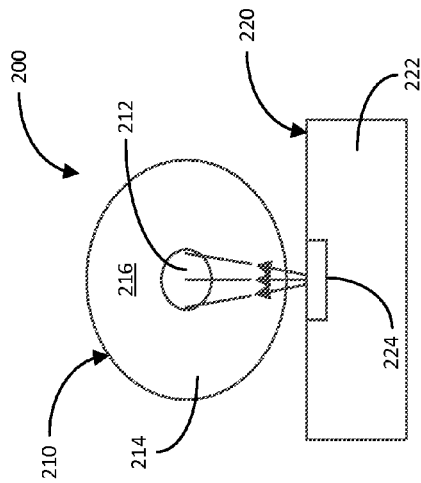
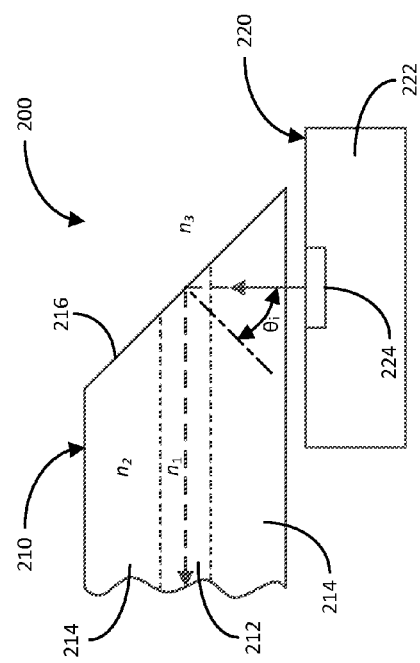
FIG. 2C
FIG. 2B
FIG. 2A

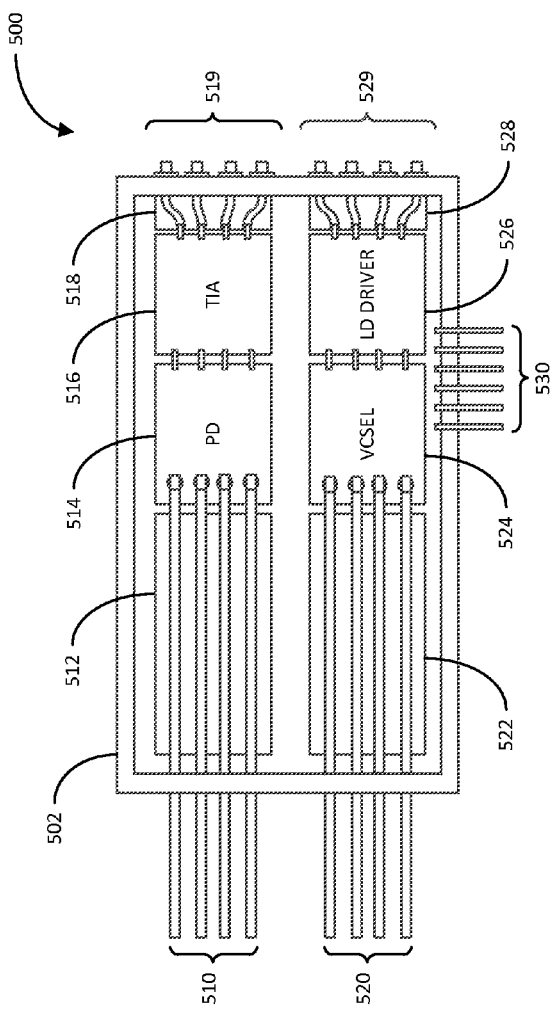
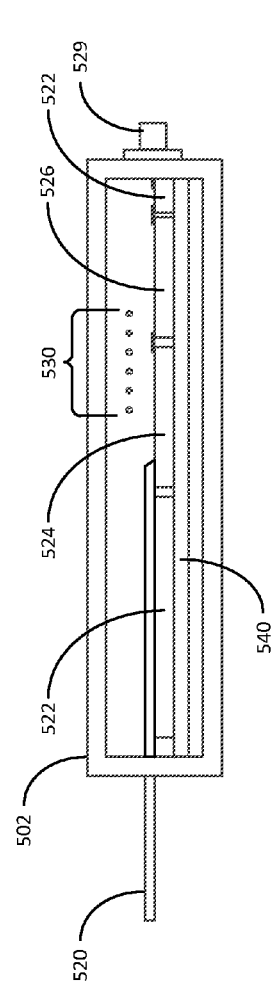
FIG. 5A
FIG. 5B

APPARATUS AND METHOD FOR COUPLING OPTICAL SIGNALS BETWEEN OPTICAL FIBERS AND PHOTO DEVICES

CROSS REFERENCE TO A RELATED APPLICATION

The application claims the benefit of the filing date of Provisional Application Ser. No. 61/694,130, filed on Aug. 28, 2012, and entitled, "Apparatus and Method for Coupling Optical Signals Between Optical Fibers and Photo Devices," which is incorporated herein by reference.

FIELD

The present disclosure relates generally to optical systems and components, and in particular, to an apparatus and method for coupling optical signals between optical fibers and photo devices.

BACKGROUND

In many optical systems, optical signals are often converted into electrical signals, and conversely, electrical signals are often converted into optical signals. For example, photo devices, such as photodiodes or photo detectors, are often employed to convert optical signals into electrical signals for further processing and/or transmission in the electrical domain. Similarly, photo devices, such as vertical cavity surface emitting lasers (VCSELs), are often employed to convert electrical signals into optical signals for further processing and/or transmission in the optical domain.

Further, in accordance with many optical systems, fiber optic mediums, such as fiber optic cables, are employed for transmitting optical signals between various components and systems. A fiber optic medium typically comprises a core and a cladding surrounding the core. Other fiber optic mediums may include other layers, such as a jacket or buffer coating disposed on the outer surface of the cladding. Generally, the core comprises an optical material with an index of refraction $n_1$, and the cladding comprises another optical material with an index of refraction $n_2$. In order to maintain optical signals propagating primarily through the core of the fiber optic medium, the index of refraction $n_1$ of the core is typically greater than the index of refraction $n_2$ of the cladding.

Often, in many optical systems, complex structures, such as mounts, are developed in order to effectively interface photo devices with optical fibers. In many cases, these structures are difficult and expensive to manufacture, and generally require complex and precise assembly so that optical signals can be effectively received by photo devices, and optical signals can be effectively coupled to optical fibers from photo devices. Accordingly, there is a need for an improved system and method for coupling optical signals between optical fibers with photo devices.

SUMMARY

An aspect of the disclosure relates to an apparatus for coupling an optical signal from an optical fiber to a photo device. The apparatus comprises an optical fiber including an end surface at a proximal end of the fiber, wherein the end surface is configured to produce internal reflection of an incident optical signal propagating within the fiber from a distal end thereof. The apparatus further comprises a photo device situated proximate the proximal end of the optical fiber, and configured to receive the reflected optical signal for conversion into an electrical signal. As discussed in more detail, the end surface is formed by cutting an end of the optical fiber at a defined acute angle with respect to the longitudinal axis of the optical fiber.

Another aspect of the disclosure relates to an apparatus for coupling an optical signal from a photo device to an optical fiber. The apparatus comprises an optical fiber including an end surface at a proximal end of the fiber, wherein the end surface is configured to produce internal reflection of an incident optical signal generated by a photo device situated proximate the proximal end of the fiber. The end surface is configured to direct the reflected optical signal for propagation within the optical fiber to a distal end thereof. As discussed in more detail, the end surface is formed by cutting an end of the optical fiber at a defined acute angle with respect to the longitudinal axis of the optical fiber.

Another aspect of the disclosure relates to an apparatus for coupling an optical signal from an optical fiber to a photo device. The apparatus comprises an optical fiber including an end surface at a proximal end of the fiber, wherein the end surface is configured to refract an incident optical signal propagating within the fiber from a distal end thereof. The apparatus further comprises a photo device situated proximate the proximal end of the optical fiber, and configured to receive the refracted optical signal for conversion into an electrical signal. As discussed in more detail, the end surface is formed by cutting an end of the optical fiber at a defined acute angle with respect to the longitudinal axis of the optical fiber, and coating the end with a material having a defined index of refraction.

Another aspect of the disclosure relates to an apparatus for coupling an optical signal from a photo device to an optical fiber. The apparatus comprises an optical fiber comprising an end surface at a proximal end of the fiber, wherein the end surface is configured to refract an incident optical signal generated by a photo device situated proximate the proximal end of the fiber. The end surface is configured to direct the refracted optical signal for propagation within the optical fiber to a distal end thereof. As discussed in more detail, the end surface is formed by cutting an end of the optical fiber at a defined acute angle with respect to the longitudinal axis of the optical fiber, and coating the end with a material having a defined index of refraction.

Another aspect of the disclosure relates to an optical transceiver that uses any one or more of the apparatuses for coupling optical signals between optical fibers and photo devices. The optical transceiver comprises a receiver section and a transmitter section.

The receiver section comprises one or more photo detectors respectively coupled to one or more optical fibers in accordance with any of the aforementioned techniques. The one or more photo detectors convert one or more optical signals received from the one or more optical fibers into one or more electrical currents, respectively. One or more transimpedance amplifiers amplify and convert the one or more electrical currents into one or more electrical voltages, respectively.

The transmitter section comprises one or more laser diode (LD) drivers adapted to convert one or more voltages into one or more drive signals, respectively. The transmitter section further comprises one or more VCSELs adapted to generate one or more optical signals from the one or more drive signals, respectively. The transmitter section further comprises one or more optical fibers respectively coupled to the one or more VCSELs in accordance with any of the aforementioned techniques. The one or more optical signals from the one or more VCSELs are respectively coupled to the one or more optical fibers for transmission to one or more remote devices and/or components.

Other aspects, advantages and novel features of the present invention will become apparent from the following detailed description of the invention when considered in conjunction with the accompanying drawings.

BRIEF DESCRIPTION OF THE DRAWINGS

FIGS. 1A-1C illustrate side, front, and top views of an exemplary apparatus for coupling an optical signal from an optical fiber to a photo device in accordance with an aspect of the disclosure.

FIGS. 2A-2C illustrate side, front, and top views of an exemplary apparatus for coupling an optical signal from a photo device to an optical fiber in accordance with another aspect of the disclosure.

FIGS. 5A-5B illustrate top and side views of an exemplary optical transceiver in accordance with another aspect of the disclosure.

DETAILED DESCRIPTION OF THE EXEMPLARY EMBODIMENTS

Figure 3C:
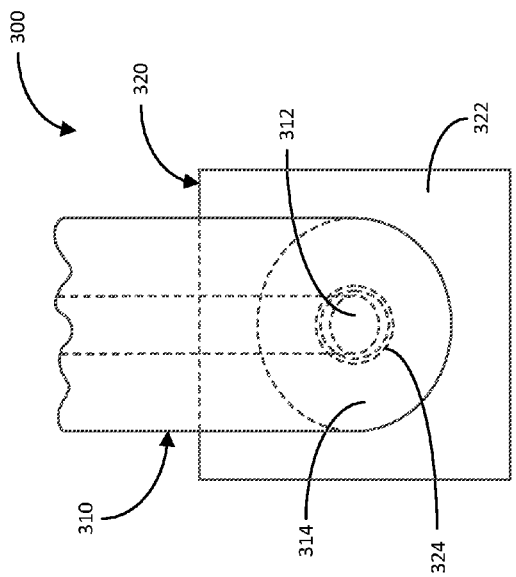
FIGS. 3A-3C illustrate side, front, and top views of another exemplary apparatus for coupling an optical signal from an optical fiber to a photo device in accordance with an aspect of the disclosure.

FIGS. 1A-1C illustrate side, front, and top views of an exemplary apparatus 100 for coupling an optical signal from an optical fiber to a photo device in accordance with an aspect of the disclosure. As discussed in more detail herein, the apparatus 100 comprises an optical fiber having an end surface configured to produce internal reflection of an incident optical signal at an angle that directs the reflected optical signal towards a photo device situated proximate the end of the optical fiber. An optical signal, as defined herein, may be modulated or unmodulated, such as a carrier wave (CW). Although one end of the optical fiber is used to illustrate the techniques described herein, it shall be understood that the opposite end may be configured in the same or similar manner.

In particular, the apparatus 100 comprises an optical fiber 110 and a photo device 120. The optical fiber 110 comprises a core 112 and a cladding 114 radially surrounding the core 112, both of which extend in parallel along the longitudinal axis of the optical fiber. In this example, the core 112 of the optical fiber 110 is made of an optical material with an index of refraction $n_1$, and the cladding 114 is made of another optical material with an index of refraction $n_2$. The index of refraction $n_1$ of the core 112 may be greater than the index of refraction $n_2$ of the cladding 114 in order to substantially confine the longitudinal propagation of an optical signal within the core 112. It shall be understood that the illustrated optical fiber 110 is merely an example, and other types of optical fibers or mediums may be used in accordance with the concepts described herein.

In this exemplary embodiment, the optical fiber 110 includes a boundary or end surface 116, situated at a longitudinal end of the fiber, which is cut to form an acute angle (i.e., <90 degrees) with respect to the longitudinal axis of the optical fiber. Or, characterized in a different manner, the end surface 116 of the optical fiber 110 is configured to form an acute angle $\theta_i$ between the normal to the surface 116 and an incident optical signal propagating longitudinally via the core 112 of the optical fiber 110. By properly configuring the index of refraction $n_1$ of the core 112 with respect to the index of reflection $n_3$ of the medium (e.g., air or vacuum, where $n_3 \cong 1.0$) external to the optical fiber 110, and the angle $\theta_i$, the end surface 116 produces internal reflection of an incident optical signal propagating through the core 112 of the optical fiber 110. For example, the angle $\theta_i$ between the normal to the end surface 116 and the incident optical signal may be configured in accordance with the following relationship to produce total internal reflectance (TIF) of the incident optical signal:

$$\theta_i \geq \arcsin\frac{n_3}{n_1} \qquad \text{Eq. 1}$$

where, as previously discussed, $n_1$ is the index of refraction of the core 112 of the optical fiber 110 and $n_3$ is the index of refraction of the medium (e.g., air or vacuum) external to the optical fiber 110.

In this exemplary embodiment, the photo device 120 comprises a substrate 122, such as a semiconductor substrate, and a photo diode or detector 124 formed within the substrate 122. The photo device 120 is positioned proximate the end surface 116 of the optical fiber 110 in a manner that the photo detector 124 receives at least a portion of the internally reflected optical signal. The photo detector 124 converts the received optical signal into an electrical signal for transmission and/or processing in the electrical domain.

As illustrated, by cutting a proximal longitudinal end of an optical fiber in a manner so as to produce internal reflection of an incident optical signal propagating through the fiber optic from a distal longitudinal end of the fiber, and positioning a photo diode or detector to receive the reflected optical signal, the apparatus 100 provides an easily-manufacturable optical interface between an optical fiber and a photo device. The external side of the end surface 116 of the optical fiber 110 may be polished to improve the efficiency of the reflection of the incident optical signal as well as to control the angle of reflection so that the photo detector may efficiently receive the reflected optical signal.

FIGS. 2A-2C illustrate side, front, and top views of another exemplary apparatus 200 for coupling an optical signal from a photo device to an optical fiber in accordance with another aspect of the disclosure. In the previous exemplary embodiment, the apparatus 100 was configured to direct an optical signal propagating longitudinally via an optical fiber to a photo detector positioned proximate an end of the optical fiber. In this exemplary embodiment, the apparatus 200 is configured to direct an optical signal generated by a photo device proximate an end of an optical fiber into the optical fiber for propagating longitudinally therein towards an opposite end of the fiber.

In particular, the apparatus 200 comprises an optical fiber 210 and a photo device 220. The optical fiber 210 comprises a core 212 and a cladding 214 radially surrounding the core 212, both of which extend parallel along the longitudinal axis of the fiber. In this example, the core 212 of the optical fiber 210 is made of an optical material with an index of refraction $n_1$, and the cladding 214 is made of another optical material with an index of refraction $n_2$. The index of refraction $n_1$ of the core 212 may be greater than the index of refraction $n_2$ of the cladding 214 in order to substantially confine the longitudinal propagation of an optical signal within the core 212. It shall be understood that the illustrated optical fiber 210 is merely an example, and other types of optical fibers or mediums may be used in accordance with the concepts described herein.

In this exemplary embodiment, the optical fiber 210 includes an end surface 216, situated at a longitudinal end of the fiber, which is cut to form an acute angle (i.e., <90 degrees) with respect to the longitudinal axis of the optical fiber. Or, characterized in a different manner, the end surface 216 of the optical fiber 210 is configured to form an acute angle $\theta_i$ between the normal to the surface 216 and an incident optical signal generated by the photo device 220. By configuring the index of refraction $n_1$ of the core 212 with respect to the index of reflection $n_3$ of the medium (e.g., air or vacuum, where $n_3 \approx 1.0$) external to the optical fiber 210 and the angle $\theta_i$, the end surface 216 produces internal reflection of the incident optical signal generated by the photo device 220. For example, the angle $\theta_i$ between the normal to the end surface 216 and the incident optical signal may be configured in accordance with Eq. 1.

In this exemplary embodiment, the photo device 220 comprises a substrate 222, such as a semiconductor substrate, and an optical signal producing device 224, such as a VCSEL, formed within the substrate. The photo device 220 is positioned proximate the end surface 216 of the optical fiber 210 in a manner that the optical signal produced by the VCSEL 224 is directed at and reflects off the internal side of the end surface 216 and propagates longitudinally via the core 212 towards the opposite end of the optical fiber 210. The optical fiber 210 facilitates the transmission of the optical signal to another device or component situated proximate the opposite end of the optical fiber.

As illustrated, by cutting an end of an optical fiber in order to produce internal reflection of an optical signal generated by a properly-positioned photo device, the apparatus 200 provides an easily-manufacturable optical interface between an optical fiber and a photo device. The external side of the end surface 216 of the optical fiber 210 may be polished to improve the efficiency of the reflection of the incident optical signal as well as to control the angle of reflection so that the optical signal propagates longitudinally via the core 212 towards the opposite end of the optical fiber 210.

Figure 3B:
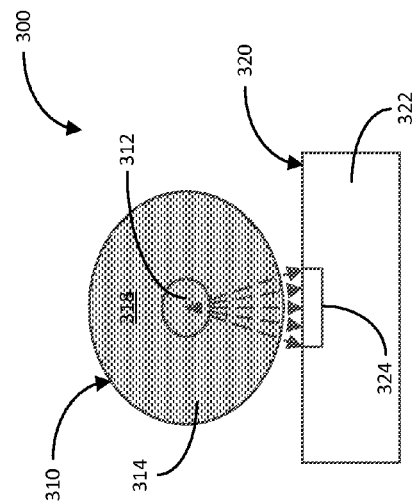
Figure 3A:
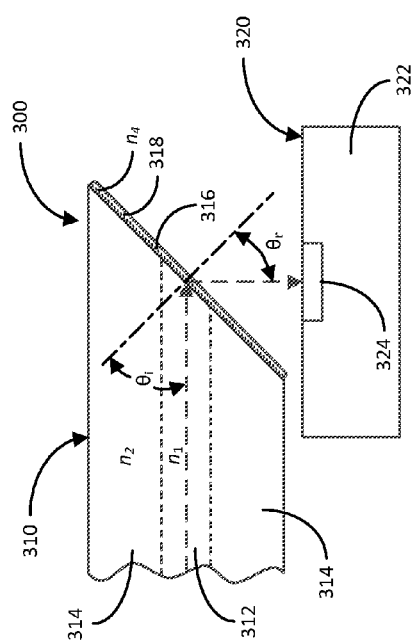

FIGS. 3A-3C illustrate side, front, and top views of another exemplary apparatus 300 for coupling an optical signal from an optical fiber to a photo device in accordance with another aspect of the disclosure. In the previous embodiments, the optical fibers 100 and 200 were configured to produce internal reflection of an incident optical signal to direct it to a photo detector or a distal end of the optical fiber. In this embodiment, the apparatus 300 is configured to refract an incident optical signal propagating via the optical fiber towards a photo device.

In particular, the apparatus 300 comprises an optical fiber 310 and a photo device 320. The optical fiber 310 comprises a core 312 and a cladding 314 radially surrounding the core 312, both of which extend parallel along the longitudinal axis of the fiber. In this example, the core 312 of the optical fiber 310 is made of an optical material with an index of refraction $n_1$, and the cladding 314 is made of another optical material with an index of refraction $n_2$. The index of refraction $n_1$ of the core 312 may be greater than the index of refraction $n_2$ of the cladding 314 in order to substantially confine the longitudinal propagation of an optical signal within the core 312. It shall be understood that the illustrated optical fiber 310 is merely an example, and other types of optical fibers or mediums may be used in accordance with the concepts described herein.

In this exemplary embodiment, the optical fiber 310 includes an end surface 316, situated at a longitudinal end of the fiber, which is cut to form an acute angle (i.e., <90 degrees) with respect to the longitudinal axis of the optical fiber. Or, characterized in a different manner, the end surface 316 of the optical fiber 310 is configured to form an acute angle $\theta_i$ between the normal to the surface 316 and an incident optical signal propagating longitudinally via the core 316 of the optical fiber 3100. The external side of the end surface 316 is coated with a translucent material 318 having an index of refraction $n_4$. By configuring the index of refraction $n_1$ of the core 312 with respect to the index of reflection $n_4$ of the coating 318, the end surface 316 refracts or diverts the incident optical signal propagating via the core 312 as it exits the fiber through the end surface 316. For example, the angle $\theta_i$ between the normal to the end surface 316 and the incident optical signal may be configured in accordance with the following relationship:

$$\frac{\operatorname{Sin}\theta_i}{\operatorname{Sin}\theta_r} = \frac{n_4}{n_1} \qquad \text{Eq. 2}$$

to achieve a desired angle of refraction $\theta_r$ in order to direct the refracted light toward the photo device 320 properly positioned near the end surface 316 of the optical fiber 310.

In this exemplary embodiment, the photo device 320 comprises a substrate 322, such as a semiconductor substrate, and a photo diode or detector 324 formed within the substrate 322. The photo device 320 is positioned proximate the end surface 316 of the optical fiber 310 in a manner that the photo detector 324 receives the refracted optical signal exiting through the end surface 316 of the optical fiber 310. The photo detector 324 converts the received optical signal into an electrical signal for transmission and/or processing in the electrical domain.

As illustrated, by cutting an end of an optical fiber to produce an angle $\theta_i$ between the normal to the end surface 316 and the longitudinal axis of the optical fiber 310, coating the end surface 316 with a material 318 having a defined index of refraction $n_4$ with respect to the index of refraction $n_2$ of the core 312, and positioning a photo detector to receive the refracted optical signal 310 exiting the optical fiber by way of the end surface 316, the apparatus 300 provides an easily-manufacturable optical interface between a fiber optic and a photo device. The external end 316 of the optical fiber 310, prior to coating, may be polished to improve the efficiency of the refracted optical signal exiting the optical fiber 310 through the end surface 316, as well as to control the angle of refraction so that the photo detector may efficiently receive the refracted optical signal.

Figure 4C:
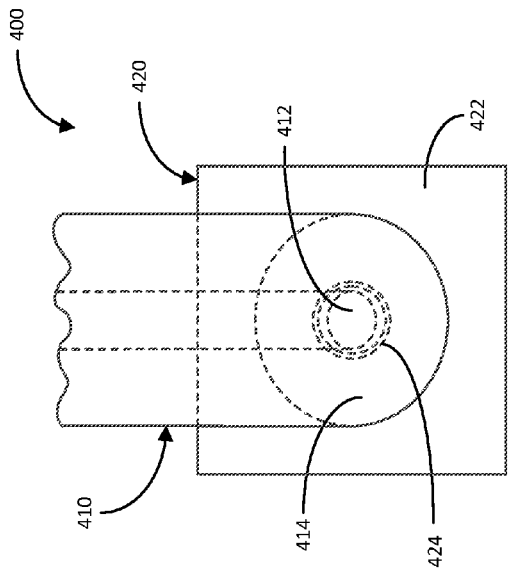
FIGS. 4A-4C illustrate side, front, and top views of another exemplary apparatus for coupling an optical signal from a photo device to an optical fiber in accordance with another aspect of the disclosure.
Figure 4B:
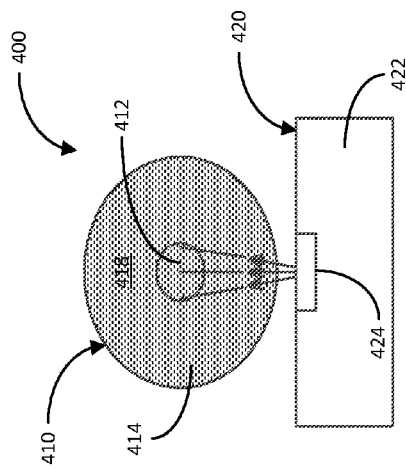
Figure 4A:
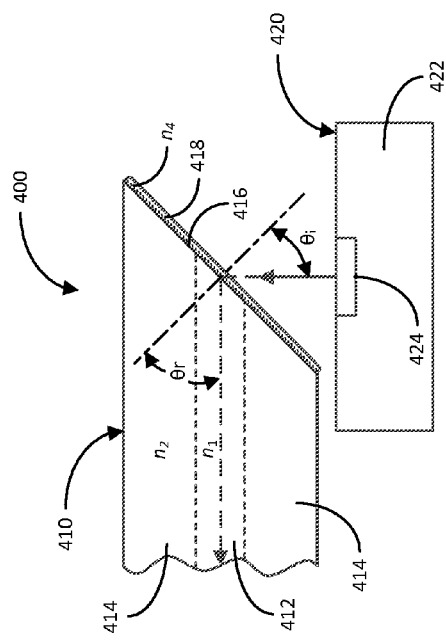

FIGS. 4A-4C illustrate side, front, and top views of another exemplary apparatus 400 for coupling an optical signal from a photo device to an optical fiber in accordance with another aspect of the disclosure. In the previous exemplary embodiment, the apparatus 300 was configured to direct an optical signal propagating longitudinally via an optical fiber to a photo detector positioned proximate an end of the optical fiber. In this exemplary embodiment, the apparatus 400 is configured to direct an optical signal generated by a photo device situated near a proximal end of an optical fiber into the optical fiber for propagation of the optical signal towards a distal end of the optical fiber.

In particular, the apparatus 400 comprises an optical fiber 410 and a photo device 420. The optical fiber 410 comprises a core 412 and a cladding 414 radially surrounding the core 412, both of which extend parallel along the longitudinal axis of the fiber. In this example, the core 412 is made of a translucent material with an index of refraction $n_1$, and the cladding 414 is made of another translucent material with an index of refraction $n_2$. The index of refraction $n_1$ of the core 412 may be greater than the index of refraction $n_2$ of the cladding 414 in order to substantially confine the longitudinal propagation of an optical signal within the core 412. It shall be understood that the illustrated optical fiber 410 is merely an example, and other types of optical fibers or mediums may be used in accordance with the concepts described herein.

In this exemplary embodiment, the optical fiber 410 includes an end surface 416, situated at a longitudinal end of the fiber, which is cut to form an acute angle (i.e., <90 degrees) with respect to the longitudinal axis of the optical fiber. Or, characterized in a different manner, the end surface 416 of the optical fiber 410 is configured to form an acute angle $\theta_i$ between the normal to the surface 416 and an incident optical signal generated from the photo device 420. The external side of the end surface 416 is coated with an optical material 418 having an index of refraction $n_4$. By configuring the index of refraction $n_1$ of the core 412 with respect to the index of reflection $n_4$ of the coating 418, the end surface 416 may be configured to refract or divert the incident optical signal generated from the photo device 420 for internal longitudinal propagation within the core 412 of the fiber 410 towards a distal end thereof. For example, the angle $\theta_i$ between the normal to the end surface 416 and the incident optical signal may be configured in accordance with Eq. 2 to achieve a desired angle of refraction $\theta_r$ in order to direct the refracted light for longitudinal propagation within the core 412 for propagation towards the distal end of the optical fiber 410.

In this exemplary embodiment, the photo device 420 comprises a substrate 422, such as a semiconductor substrate, and an optical signal generating device 424, such as a VCSEL, formed within the substrate 422. The photo device 420 is positioned proximate the end surface 416 of the optical fiber 410 in a manner that the optical signal produced by the VCSEL 424 is directed towards the external side of the end surface 416, wherein the coated end surface 416 causes the incident optical signal to refract into the core 412 for propagation toward the distal end of the optical fiber 410.

As illustrated, by cutting an end of an optical fiber to produce an angle $\theta_r$ between the normal to the end surface 416 and the longitudinal axis of the optical fiber 410, coating the end with a material having a defined index of refraction $n_4$ with respect to the index of refraction $n_2$ of the core 412, and positioning the VCSEL to generate an optical signal incident upon the end surface 416 of the optical fiber 410, the apparatus 400 provides an easily-manufacturable optical interface between a fiber optic and a photo device. The external end 416 of the optical fiber 410, prior to coating, may be polished to improve the efficiency of the incident optical signal entering the optical fiber 410 through the end surface 416, as well as to control the angle of refraction $\theta_r$ so that the optical signal propagates efficiently via the core 412 towards the distal end of the optical fiber 410.

FIGS. 5A-5B illustrate top and side views of an exemplary optical transceiver 500 in accordance with another aspect of the disclosure. The optical transceiver 500 is one of many exemplary applications for the aforementioned apparatuses for optically interfacing an optical fiber with a photo device. In particular, the optical transceiver 500 comprises a housing 502, which encloses or houses the components of the transceiver. The optical transceiver 500 further comprises a receiver section and a transmitter section.

The receiver section comprises a first set of optical fibers 510, a coplanar mount 512 for supporting the first set of optical fibers 510 in a substantially planar manner within the housing 502, a photo diode or detector (PD) component 514, a transimpedance amplifier component (TIA) 518, a coplanar connector interface 518, and a first set of connectors 519. The transceiver section, in turn, comprises a second set of optical fibers 520, a coplanar mount 512 for supporting the second set of optical fibers 520 in a substantially planar manner within the housing 502, a VCSEL component 524, a laser diode (LD) driver component 526, a coplanar connector interface 528, and a second set of connectors 529. The optical receiver 500 may further comprise a set of electrical connectors 530 for receiving power and control signals for operating the various components of the transceiver, and for outputting information related the operation of the transceiver.

In operation, with regard to the receiver section, a plurality of optical signals may be received by the transceiver 500 by way of the first set of optical fibers 510. The photo detector (PD) component 514 may include a corresponding set of photo detectors adapted to convert the received optical signals into electrical currents, respectively. The interfaces between the optical fibers and the corresponding photo detectors may be configured in accordance with any of the optical interfaces previously discussed. The transimpedance amplifier component 516 includes transimpedance amplifiers to amplify and convert the corresponding photo detector currents into voltages. The coplanar connector interface 518 routes the voltages to connectors 519 for subsequent transmission to one or more other devices (not shown). It shall be understood that the optical transceiver 500 need not include the connectors 519, and the coplanar connector interface 518 may route the voltages to one or more surface mount components or the like.

Similarly, with regard to the transmitter section, electrical signals may be received by way of connectors 529. It shall be understood that the optical transceiver 500 need not include the connectors 529, and the electrical signals may be generated by one or more surface mount components or the like. The coplanar connector interface 529 routes the received electrical signals to the laser diode (LD) driver component 526. The laser diode (LD) driver component 526 includes drivers to amplify the electrical signals to levels appropriate for driving the VCSELs of the VCSEL component 524. The VCSELs of the VCSEL component 524 convert the corresponding drive signals to optical signals for transmission by way of the second set of optical fibers 520. The interfaces between the VCSELs and corresponding optical fibers may be configured in accordance with any of the optical interfaces previously discussed.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus, comprising:
a first photo device configured to generate an optical signal;
an optical fiber comprising a distal end configured to receive the optical signal from the first photo device, the optical fiber further comprising an end surface at a proximal end of the optical fiber, wherein the end surface is configured to refract the optical signal propagating within the optical fiber from the distal end thereof; and a second photo device situated proximate the proximal end of the optical fiber, wherein the second photo device is configured to receive the refracted optical signal.

2. The apparatus of claim 1, wherein a first defined acute $\theta_i$ angle exist between a normal to the end surface and a longitudinal axis of the optical fiber, and wherein a second defined acute angle $\theta_r$ between the normal to the end surface and a direction of the refracted optical signal.

3. The apparatus of claim 2, wherein the first and second acute angles $\theta_i$ and $\theta_r$ are defined in accordance with a following relationship:

$$\frac{\mathrm{Sin}\theta_i}{\mathrm{Sin}\theta_r} = \frac{n_2}{n_1}$$

wherein $n_1$ is an index of refraction of a core of the optical fiber and $n_2$ is an index of refraction of a coating applied to the end surface.

4. The apparatus of claim 1, wherein the second photo device comprises a photo detector adapted to generate an electrical signal based on the refracted optical signal.

5. The apparatus of claim 1, wherein the optical fiber comprises a second end surface at the distal end of the optical fiber, wherein the second end surface is configured to produce internal reflection of the optical signal for propagation within the optical fiber towards the proximal end thereof.

6. The apparatus of claim 5, wherein the second end surface is configured to produce total internal reflection of the optical signal.

7. The apparatus of claim 1, wherein the first photo device comprises a vertical cavity surface emitting laser (VCSEL) adapted to generate the optical signal.

8. The apparatus of claim 1, wherein the optical fiber comprises a second end surface at the distal end of the optical fiber, wherein the second end surface is configured to refract the optical signal for propagation within the optical fiber towards the proximal end thereof.

9. The apparatus of claim 8, wherein the second end surface of the optical fiber is coated with a translucent material.

10. An apparatus, comprising:
a first photo device configured to generate an optical signal;
an optical fiber comprising a distal end configured to receive the optical signal from the first photo device, the optical fiber further comprising:
a first end surface at a proximal end of the optical fiber, wherein the first end surface is configured to reflect the optical signal propagating within the optical fiber from the distal end thereof; and
a second end surface at the distal end of the optical fiber, wherein the second end surface is configured to refract the optical signal for propagation within the optical fiber towards the proximal end thereof; and
a second photo device situated proximate the proximal end of the optical fiber, wherein the second photo device is configured to receive the reflected optical signal.

11. The apparatus of claim 10, wherein the first end surface is configured to produce total internal reflection of the optical signal.

12. The apparatus of claim 10, wherein the second photo device comprises a photo detector adapted to generate an electrical signal based on the reflected optical signal.

13. The apparatus of claim 10, wherein the first photo device comprises a vertical cavity surface emitting laser (VCSEL) adapted to generate the optical signal.

14. The apparatus of claim 10, wherein the second end surface of the optical fiber is coated with a translucent material.

* * * * *